(12) United States Patent
Sitaraman et al.

(10) Patent No.: US 7,010,598 B2
(45) Date of Patent: Mar. 7, 2006

(54) METHOD AND APPARATUS FOR MEASURING STREAM AVAILABILITY, QUALITY AND PERFORMANCE

(75) Inventors: Ramesh K. Sitaraman, Cambridge, MA (US); Reid W. Barton, Arlington, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 10/364,753

(22) Filed: Feb. 11, 2003

(65) Prior Publication Data
US 2004/0136327 A1 Jul. 15, 2004

Related U.S. Application Data

(60) Provisional application No. 60/356,076, filed on Feb. 11, 2002.

(51) Int. Cl.
*G09F 15/16* (2006.01)
*G06F 17/40* (2006.01)
(52) U.S. Cl. ...................................... 709/224; 709/231
(58) Field of Classification Search ................ 709/224, 709/231; 714/38, 47; 717/120, 124, 127, 717/131
See application file for complete search history.

(56) References Cited

U.S. PATENT DOCUMENTS 5,732,218 A * 3/1998 Bland et al. ................. 709/224
5,958,010 A * 9/1999 Agarwal et al. ............. 709/224
6,141,686 A * 10/2000 Jackowski et al. .......... 709/224
6,671,724 B1 * 12/2003 Pandya et al. .............. 709/226
6,714,976 B1 * 3/2004 Wilson et al. ............... 709/224
2001/0018673 A1 * 8/2001 Goldband et al. ............ 705/27

OTHER PUBLICATIONS

StreamCheck "Measurement Methodology" and "FAQ". www.streamcheck.com. Jan. 22, 2002. Retrieved from web.archive.org.*
"Picture Quality Indicator", IBM TDB NNRD410114, Jun. 1998.*

* cited by examiner

*Primary Examiner*—Dung C. Dinh
(74) *Attorney, Agent, or Firm*—David H. Judson

(57) ABSTRACT

A streaming measurement agent designed to experience, measure, and report on a media stream as an actual end user would experience the stream. Preferably, agent resides transparently within a streaming media player itself so that it can monitor stream packet flows within the player as the measured streams are being played. In an illustrative embodiment, the agent comprises a performance monitoring module (PMM), which is software that resides in an interface between an existing core module and a renderer of a media player. The agent PMM intercepts each useful packet as it goes from the core to the renderer and, as a result, it is able to compute quality metrics about the playback. The agent functions "transparently" to the media player by presenting the core with an application programming interface (API) that emulates the API that the renderer normally presents to the core. Thus, when the core believes it is calling the renderer, it is actually calling the agent PMM, which can then receive all the packets from the core and process them. After computing relevant performance metrics using the packets it receives, the agent PMM calls the renderer. A set of performance agents can be managed by a service provider to enable a content provider to determine how a stream is perceived by end users.

9 Claims, 2 Drawing Sheets

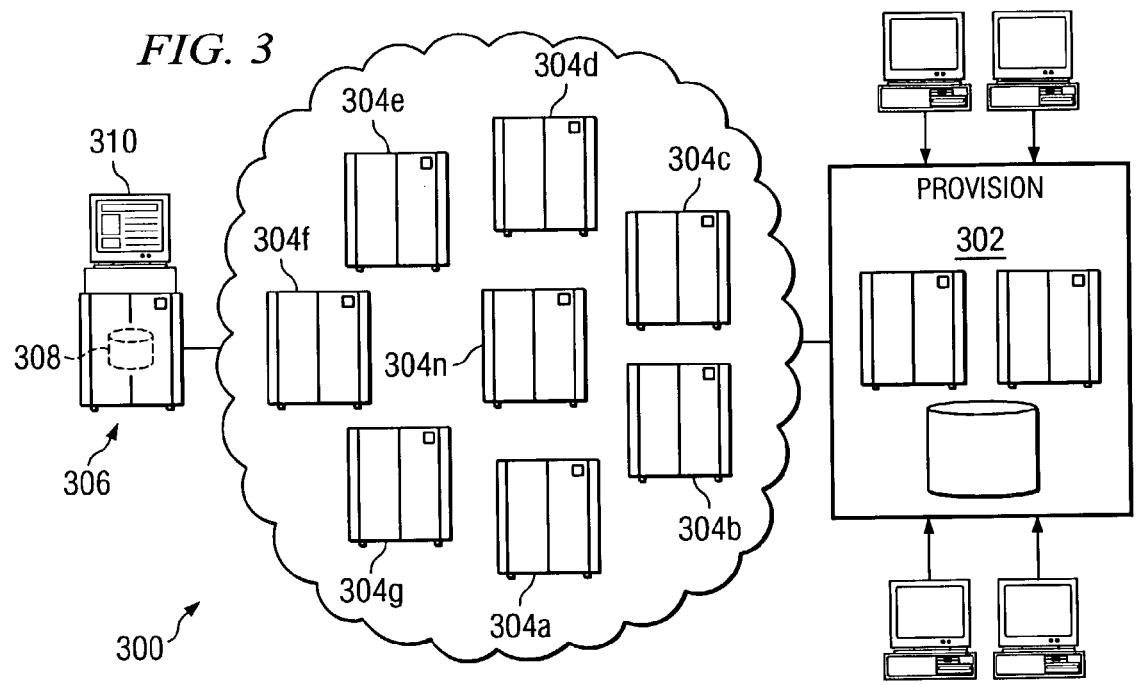
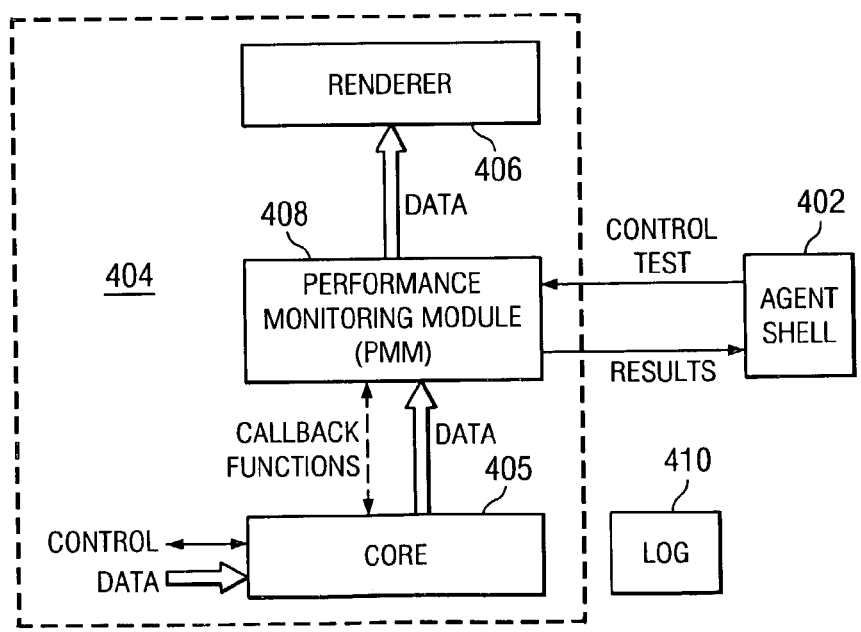

METHOD AND APPARATUS FOR MEASURING STREAM AVAILABILITY, QUALITY AND PERFORMANCE

This case is related to and claims priority from Provisional Application No. 60/356,076, filed Feb. 11, 2002.

BACKGROUND OF THE INVENTION

1. Technical Field

The present invention relates generally to measuring the performance of streaming media delivery.

2. Description of the Related Art

Streaming media is a type of Internet content that has the important characteristic of being able to be played while still in the process of being downloaded. A client machine can play the first packet of the stream, and decompress the second, while receiving the third. Thus, an end user can start enjoying the multimedia without waiting to the end of transmission. Streaming is very useful for delivering media because media files tend to be large, particularly as the duration of the programming increases. Indeed, for live events, the file size, in effect, is infinite. To view a media file that is not streamed, users must first download the file to a local hard disk-which may take minutes or even hours- and then open the file with player software that is compatible with the file format. To view streaming media, the user's browser opens player software, which buffers the file for a few seconds and then plays the file while simultaneously downloading it. Unlike software downloads, streaming media files are not stored locally on a user's hard disk. Once the bits representing content are used, the player typically discards them.

Streaming media usually relies on proprietary server and client software. The server, client, production and encoding tools developed by a streaming software vendor are collectively referred to as a format. Streaming media encoded in a particular format must be served by that format's media server and replayed by that format's client. Streaming media clients are often called players, and typically they exist as plug-ins to Web browsers. The three major streaming media formats in use today are: RealNetworks RealSystem G2, Microsoft Windows Media Technologies ("WMT"), and Apple QuickTime.

An ever-growing number of content providers, enterprises, and content delivery networks utilize and deliver streaming media. As a consequence, it has become important to quantify, in a scientific and measurable way, how well a given stream was delivered, as well as to devise relevant metrics that capture the end-user's experience of the stream. Client media players have the capability of generating basic statistics about the streams they deliver. Unfortunately, the correlation of some of these statistics with a high quality end-user experience is subjective and thus extremely difficult to measure effectively. For example, frame rate, a commonly used metric reported by media players, may not be a robust indicator of stream quality because players can interpolate and insert variable-quality frames into a stream. As another example, some media players report a bandwidth metric that does not accurately indicate whether or not the bytes are received in a timely fashion so that they can be used for rendering.

There are several companies, such as Keynote, StreamCheck, and others, that provide partially or completely-outsourced streaming monitoring solutions. In an illustrative system, streaming measurement computers (sometimes called "agents") connect to URLs and collect relevant statistics, such as initial buffer time, packet information, and overall stream quality. These measurement agents are typically positioned strategically around the Internet so as to accurately represent the experience of an end user connecting to a given site URL. Providers of such outsourced performance monitoring solutions typically provide performance data in the form of real-time and historical reports, and threshold-based alarms.

By way of additional background, it is also known in the prior art that streaming performance measurement is significantly harder than web download measurements for several reasons. Unlike web performance, where it suffices to measure object download times, streams can show degradation in significantly complex ways that need to be quantified and measured. Unlike the HTTP protocol, an open protocol, measuring stream performance involves taking into account complex proprietary streaming protocols, such as RTSP (Real) and MMS (Windows Media).

One can distinguish three steps in making streaming media content available to the end-user: the media is captured and encoded, the media is delivered over the network to the client, i.e., the media player of the end-user, and the media is rendered by the media player to be viewed by the end-user. The process of delivering streaming media over the network can degrade the quality perceived by the end-user. A primary goal of a content delivery network (or "CDN") is to ensure that the media is delivered to a requesting end-user with as few distortions as possible from its pristine encoded form, thereby maximizing the end-user experience of the stream. The root causes of degradation in stream quality are problems that may occur in the underlying network that transports the media from the server to the client. For example, network connectivity may go down, which limits the ability of the client to talk to the server. The effective bandwidth available between the server and client may be greatly reduced. The network may lose packets sent from the server to the client. More subtly, the network may cause packets to be re-ordered in route to the client. Or, the packets may be delivered by the network to the client late, in which case the packets will not be useful in the stream playback.

It is instructive to examine how the client and the server react to these network problems in a manner that degrades stream quality. As noted above, typically the client and the server communicate using a proprietary protocol (such as Real's RTSP or Windows Media's MMS) to control the manner in which data is streamed from the server to the client. The client-server protocol is typically designed to overcome moderate amounts of network degradation. The player typically buffers several seconds of data ahead of what is currently being rendered. This buffering helps the player smooth out any variations in the rate at which packets are being received, including out-of-order delivery of packets. Further, buffering provides an opportunity for the player to tolerate a certain amount of packet loss, because lost packets can be re-requested from the server and received in time for playback. Consequently, a moderate degradation in the network is effectively shielded from the user.

As the network degrades further, however, one might see prolonged periods of reduction in the available bandwidth, or a significant amount of packets lost, or a significant number of packets arriving late. The server typically reacts to such a situation by sending less than the full encoded bandwidth to the client, resulting in a thinned playback. The server achieves this thinning by sending only the "more important" bytes and throwing away the rest. For example, the server may send only key video frames and audio and not send the rest of the content. In the extreme case, thinning results in the so-called "slide-show" effect, where isolated frames are displayed without interpolation. If the stream is encoded at multiple bit rates, thinning is effected more seamlessly, e.g., by the server switching to a replica of the stream encoded at a lower bit rate. Typically, the bandwidth streamed from the server to the client is controlled by a feedback loop, where the client continually estimates the available bandwidth and reports it to the server, and the server attempts to fit the stream to the available bandwidth. An even more drastic degradation in the network, e.g., a rapid reduction in the available bandwidth, may deplete the player's buffer of data. When the player cannot continue the playback, it freezes to refill its buffer before resuming again, resulting in an interrupted playback. The player is typically designed to rebuffer only under extreme network conditions.

There is a need in the art to provide for improved methods for measuring stream quality and performance. The present invention addresses this need.

BRIEF SUMMARY OF THE INVENTION

An object of the present invention is to provide a streaming measurement agent that is designed to experience, measure, and report on a media stream as an actual end user would experience the stream. Preferably, this is accomplished by having the agent reside transparently within a media player itself so that the agent can monitor stream packet flows within the player as the measured streams are being played. In an illustrative embodiment, the agent comprises a performance monitoring module (PMM), which is software that preferably resides in an interface between an existing core module and a rendering module (a "renderer") of a media player. The agent PMM preferably intercepts each useful packet as it goes from the core to the rendering module and, as a result, the agent is able to compute quality metrics about the rendering in an highly accurate fashion. The agent functions "transparently" to the media player by presenting the core with an application programming interface (API) that emulates the API the renderer normally presents to the core. Thus, when the core believes it is calling the renderer, the core is actually calling the agent PMM, which can then receive all the packets from the core and process them. After computing the relevant performance metrics using the packets received, the agent PMM calls the renderer, and from the perspective of the renderer the agent plays the same role as the core.

According to a feature of the invention, the agent may compute one or more quality or performance metrics by intercepting useful packets that flow inside the media player. Generally, a given statistic is generated from the intercepted useful packet. As used herein, a given statistic is some arbitrary function that can be computed from the sequence of useful packets that are intercepted. Preferably, a useful packet is one that has a given set of properties, e.g., it has not been thinned by a streaming server during delivery, it was not lost in an unrecoverable manner during delivery, and it arrived at the player in time to be useful for rendering. In one particular embodiment, the agent uses these packets to compute an actual playback bandwidth, an accurate measure of stream quality as perceived by an end user. Other packet-related metrics and bandwidth-related metrics are also obtained by monitoring the packet flow through the embedded performance monitoring module. Additionally, the agent may use native media player functions (e.g., a callback function) to obtain other useful information such as stream startup time, interruptions, components of startup time, and the like.

Monitoring the actual packet stream within the media player itself according to the present invention provides a novel way to evaluate stream availability, quality and performance. Because all, or substantially all, useful packets flow through the PMM, the present invention provides an enhanced view into the effectiveness of the stream delivery process as compared to prior art techniques. The packet flow through the PMM enables the generation of important performance metrics, such as actual playback bandwidth, and these metrics can be supplemented with metrics generated through other means, e.g., using player callback functions.

According to another aspect of the present invention, the above-described agent technology is deployed in a widely distributed manner to provide stream quality and performance measurements from a plurality of locations. As compared to prior art techniques, data collected from these agents can more accurately report on how successfully a stream is being delivered from a given server to a set of media players.

According to a further aspect of the present invention, a managed stream quality and performance measurement service is provided by a service provider on behalf of participating content providers, e.g., entities that use a content delivery network (CDN) to facilitate streaming media delivery. The service utilizes a set of performance agents such as described above that are deployed in a diverse set of networks and geographic locations to measure performance over a wide variety of conditions. The service provider may deploy the measurement agents in locations that are otherwise free of streaming servers, or co-located with such servers.

The foregoing has outlined some of the more pertinent features of the present invention. These features should be construed to be merely illustrative. Many other beneficial results can be attained by applying the disclosed invention in a different manner or by modifying the invention as will be described. Accordingly, other features and a fuller understanding of the invention may be had by referring to the following Detailed Description of the Preferred Embodiment.

BRIEF DESCRIPTION OF THE DRAWINGS

FIG. 3 is a block diagram of a stream measurement system that includes a set of monitoring agents that facilitate a managed stream quality and performance measurement service; and FIG. 4 is a block diagram of the inventive agent mechanism.

DETAILED DESCRIPTION OF THE PREFERRED EMBODIMENT

Figure 1:
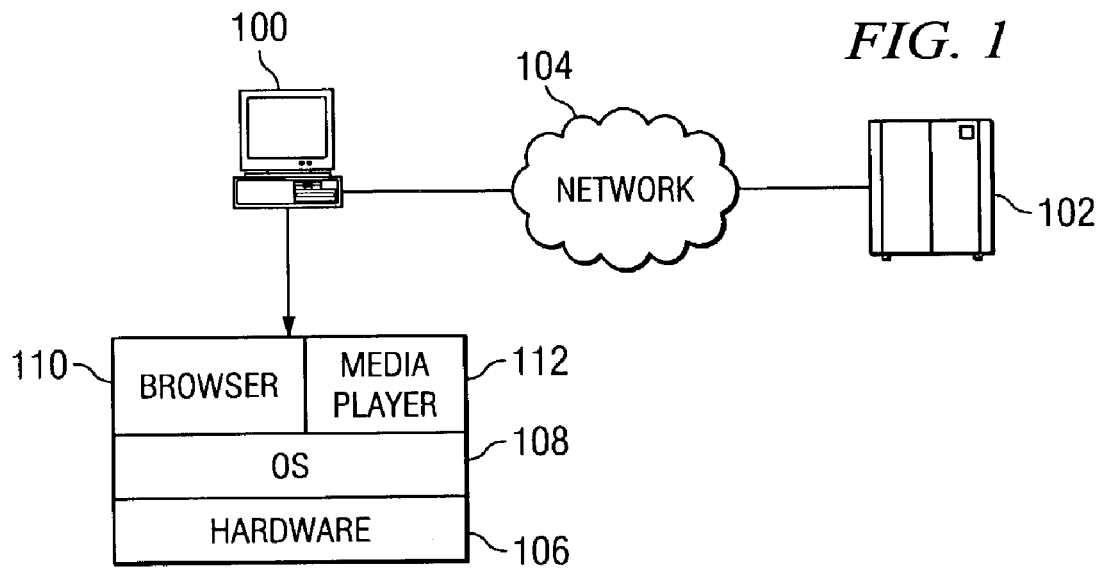
FIG. 1 is a highly simplified block diagram of a streaming media delivery mechanism.
Figure 2:
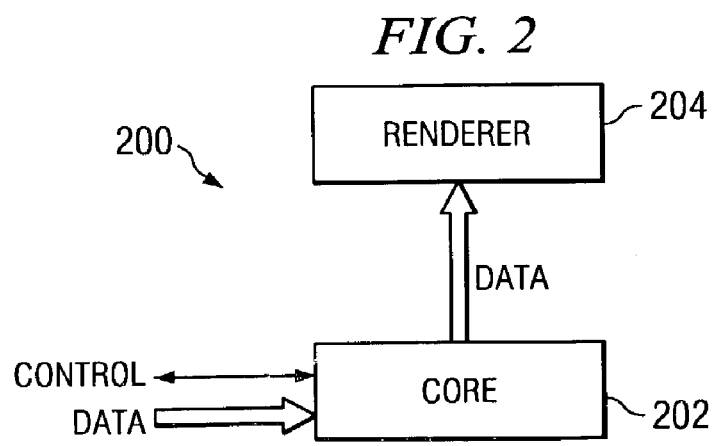
FIG. 2 is a simplified diagram of a streaming media player of the prior art.

FIG. 1 illustrates a conventional streaming delivery mechanism wherein a client machine 100 connects to a streaming media server 102 via a network 104, such as the Internet, an intranet, a content delivery network (CDN), or the like. The client machine is typically a computer having commodity hardware 106, operating system software 108, a Web browser 110, and a streaming media player 112. In a typical operation, an end user launches his or her browser to a Uniform Resource Locator (URL) identifying the media stream desired. Once the client is connected to the media server 102, the server delivers the stream over the network to the client browser, in which it is rendered by the media player. As illustrated in FIG. 2, streaming media player 200 typically includes two (2) primary components: a core 202, and a renderer 204. It should be noted that FIG. 2 is meant to provide a simplified view to illustrate the known player technology. In reality, an actual media player, such as Real and WMS, would contain several sub-modules with more complex structure implementing the core and renderer functionalities described below. Nevertheless, it is straightforward to map the ideas outlined here to specific media players to build specific agents for each of the well-known formats including Real, WMS and Quicktime. Of course, the inventive agent technology is not limited for use with these known formats, as the methods and techniques described below may be used with any stream packet rendering device.

The core 202 is responsible for transporting data received from the media server. Typically, the core 202 establishes a control channel to exchange control information with the media server. Such information may include requests from the player to describe, play, pause, stop the stream, feedback from the player on the perceived bandwidth, packet loss and other metrics, information from the server on the media that is being requested, and so forth. As noted above, the control protocol between the core and the media server is typically proprietary, for example, RTSP for Real and MMS for Windows Media. In addition to the control channel, the core 202 typically establishes a data channel on which the actual media stream flows from the server to the client. The media stream is a series of packets containing audio, video, and text information. The packets must be received in a timely fashion for the stream to be useful. In particular, each packet typically has a timestamp denoting when it must be rendered, and the core 202 transfers over (to the renderer 204 to be rendered) those packets that arrive in a timely fashion. The core 202 can receive packets from the server several seconds ahead of the time that they must be rendered, and the packets arriving ahead of time are stored in a buffer (not shown). This provides an opportunity for the core 202 to re-request missing packets from the server and to recover them in time for such packets to be rendered appropriately. The renderer 204 receives packets from the core 202 and renders the data contained in the packet. The renderer contains several functional units, one for each type of media, or there may be a separate renderer for each type. Audio information is rendered through the sound device on the client's computer, whereas video and text information are rendered on the computer display screen.

The agent is a piece of software capable of playing streams, measuring the availability and quality of the streams, and reporting this information. In a representative embodiment, the agent is independent of the core or the renderer, although this is not a requirement of the invention. In an appropriate case, the functionality of the agent may be native to the core, or to the renderer. A given media player vendor thus may provide the media player with the agent functionality built-in.

A given media player includes an agent, and a set of media players with embedded agents may comprise a stream monitoring system as illustrated in FIG. 3. In this example, the stream monitoring system 300 includes, without limitation, a front-end 302 where users can setup stream tests and push these tests out to a set of agents 304a–n deployed in diverse network and geographic locations; and a back-end 306 that stores the performance data reported by the agents and provides analysis tools 308 and a convenient user interface (UI) 310 for viewing the test results. The one or more computers that comprise front-end 302 and back-end 306 preferably are accessed via a secure channel, although this is not a limitation. A convenient way of implementing these sub-systems is via an intranet or extranet application, e.g., using a Web browser over a secure (SSL) connection. In one particular embodiment, a service provider uses the front-end 302 to provision the tests, and the service provider and its customers use the back-end to view or evaluate the test results. Preferably, the agents themselves schedule the tests, perform the tests, and report back on the results.

As seen in FIG. 4, an illustrative agent 400 has two primary components: an agent shell 402 and the agent nucleus 404, each of which is now described at a functional level. The agent shell 402 as illustrated is logically distinct from from the agent nucleus 404. Agent nucleus includes a performance monitoring module (PMM) 408 which resides across the interface between a core 405 and a renderer 406 and monitors the packet flow. In this embodiment, the agent nucleus 404 includes the core and the renderer (which, typically, are elements that are provided by the third party media player vendor), although this is not a requirement. Alternatively, the agent nucleus may comprise just the PMM and the core. Generally, the agent shell 402 provides control functions for the agent nucleus (and, in particular, the PMM) and initiates one or more tests, and the agent shell 402 receives the test results. In an illustrative embodiment, the agent shell includes code that provides several functions, such as determining a configuration of tests that need to be carried out, scheduling the tests, and reporting back on the stream quality, e.g., to the back-end of the stream monitoring system. The step of reading the test configuration may be accomplished by reading a configuration file present in the local machine, or by querying a real-time communication mechanism. In a representative embodiment, the configuration file is pushed from the front-end system to the agent shell, or it is pulled on-demand by the agent shell.

Typically, a configuration of tests consists of several test suites, where each test suite can be performed independently and in parallel. In a representative embodiment, each test suite has a start time when the agent needs to start testing the test suite, an end time when the agent needs to stop testing the test suite, a priority that provides scheduling information on how important the test suite is, and a frequency which determines how often the testing of the test suite is repeated. Preferably, each test suite is a series of tests that are executed in a sequence one after another. Preferably, each test is specified by the URL of the stream that needs to be tested, max startup time, which is the maximum amount of time the agent will wait for the stream to start the playback before declaring failure, max stream time, which is the amount of time in the stream that the agent plays the stream, and max play time, which is the maximum amount of actual clock time the agent will attempt to play the stream. Note the subtle distinction between stream time which is defined internal to the stream that is being measured and play time, which is actual clock time; for example, the agent could play the stream till it reaches the 3 minute point in the clip, i.e., elapsed stream time is 3 minutes, but it could actually take 4 minutes of clock time to reach that point due to rebuffering events when the play is frozen, i.e., elapsed play time is 4 minutes. Preferably, the agent stops playing the clip when either max stream time or max play time is reached, whichever is reached the earliest.

As noted above, the agent shell 402 also performs scheduling of the tests. The shell schedules the tests in the test suites per the specifications, and it hands tests in the appropriate sequence to the agent nucleus 404 for testing. The agent nucleus 404 is responsible for conducting the tests and reporting back the measured stream quality metrics back to the agent shell. In particular, the shell logs the stream quality metrics into a log file 410 that, for example, may contain one log line per test. In one embodiment, the logs are transported to the back-end system, e.g., through log mailing. Alternately, the stream quality data can also be reported back by a mechanism that is more real-time than log mailing, namely, a distributed query mechanism.

The agent nucleus 404 takes in the URL that needs to be tested, plays the stream (e.g., through at least the core), measures one or more performance metrics, and reports these metrics back to the agent shell 402. As illustrated in FIG. 4, the nucleus incorporates within it (or is otherwise associated with) a media player (e.g., a Windows Media player, a Real player, a QuickTime player) that is used to play the streams. In particular, the media player is typically a black-box, as it is a proprietary piece of software. Of course, it is known that "looking inside" a black-box to extract performance information is a challenging task. According to the present invention, however, the agent nucleus 404 overcomes these deficiencies by implementing an interface—between the core and the renderer—that is used to monitor stream performance. As noted above and as shown in FIG. 4, the agent nucleus contains a performance monitoring module (PMM) 408 that resides within (or across) this interface. As will be seen, the quality of the stream that is rendered depends on the useful packets handed over by the core to the renderer. As used herein, useful packets are considered to be those packets that are not thinned out by the server, that were not lost in an unrecoverable fashion as they were transmitted over the network from the server to client, and that arrived in time to be useful for the rendering. Preferably, the performance monitoring module 408 intercepts all or substantially all the useful packets as the packets go from the core to the renderer, and it is able to compute quality metrics about the playback.

Regardless of the media player architecture, the performance monitoring module (PMM) should be designed to "behave" like a renderer to the core to effectively intercept the useful packets. In particular, the PMM is designed to provide the same or substantially the same application programming interface (API) to the core as the renderer. Thus, when the core thinks that it is calling the renderer, it is really calling a wrapper-renderer 410 that is a part of the PMM. The wrapper-renderer 410 can then receive all the packets from the core. After computing the relevant performance metrics using the packets that it receives, the PMM can then complete the packet transfer by calling the actual renderer. From the perspective of the renderer, the PMM plays the same role as the core.

According to an illustrative embodiment, the PMM computes a one or more performance metrics by intercepting useful packets that flow inside the media player. An illustrative metric is actual playback bandwidth, which measures the bits/sec that arrive without loss and in time for rendering. Conventional media players do not provide this metric. As shown in FIG. 4, the module preferably also uses one or more callback functions provided by the media player to compute additional metrics.

A description of how PMM computes the various performance metrics follows. In particular, the following is a generic description of the performance metric computation strategy together with specific details for implementing the invention with representative media players provided by Real and WMS. To compute the metrics, the PMM may rely on a media player software development kit (SDK) for the particular streaming format. Thus, for example, a first embodiment of the agent (for use with a Real media player) relies on the RealSystem SDK. A second embodiment of the agent (for use with a WMS media player) uses the Windows Media Format SDK. In the following discussion, familarity with the Real and Windows Media player operations, as well as the associated SDKs, is presumed.

A Framework for Measuring Stream Quality

The following desribes a stream quality measurement methodology that may be implemented using the agent technology. As noted above, the agent provides a detailed inside view of the stream because it preferably sits between the core and the renderer of the media player. With this view, several first level questions may be asked about each playback that form the basis for the stream quality metrics: was the user able to connect to the server and play the stream, how long did the user have to wait before the stream playback began, and what fraction of the media was delivered effectively from the server to the player so as to be usable, and what fraction was thinned out at server, lost in transit, or arrived late so as to be unusable, were there any interruptions, i.e., rebuffers, during the playback. These first level metrics, taken together (which is not a requirement), provide a clear picture of how the stream played back. In addition, use of the agent facilitates measurement of several second level or "auxiliary" metrics that provide additional information about the stream quality. These will be defined below.

The First Level Metrics:

The first level metrics may include the following:

Failure Rate: When the user attempts to play a stream, the stream may not start-up for any number of reasons. The player may be unable to reach the server because a DNS name lookup fails, the server is down, the server is too overloaded to respond, or the network connectivity between the client and the server is down. Even if the client is able to establish connectivity with the server, the stream may not startup because the server cannot access the media, or the server is unable to get enough data to the client in a timely fashion for the playback to start. Failure rate captures, preferably as a percentage, the fraction of times the user is unable to successfully play the stream.

Startup Time: Assuming the stream playback does not fail, the agent measures startup time, which is the amount of time the user has to wait for the stream to start the playback.

Thinning and Loss: After the stream starts to play, the most common performance degradation is that the client in unable to receive the media in a timely fashion from the server. Typically, there are three modes of in which information may be lost: (a) the server may "thin" the information out and never send it to the client; (b) the server may send data, but the data is lost en-route and cannot be recovered; (c) the server may send the data, but the data might arrive too late to be used in the playback. A metric that measures these forms of degradation is referred to herein as actual playback bandwidth, which is a rate at which useful data is received by the client, i.e., data that arrives in a timely fashion so as to be used in the playback. Ideal playback bandwidth is the playback bandwidth measured at the client when the media is played under ideal conditions without degradation. Actual playback bandwidth is typically compared with the ideal playback bandwidth to understand how much of the media was thinned, lost, late or otherwise unusable by the client. An actual playback bandwidth value that is significantly smaller than the ideal value indicates visible distortions in playback, including slide-shows where only a subset of the frames are rendered on the screen.

Interruptions: A different form of degradation occurs when the player is unable to continue with the playback, e.g., because its buffer is empty. In such case, the player pauses the playback and waits for more data to arrive. Two important metrics to measure interruptions are rebuffers-per-minute, which is the average number incidents of rebuffering in a minute of playback, and rebuffer-time-per-minute, which is the average time spent rebuffering in a minute of playback.

The Auxiliary Metrics

Besides the first level metrics, there are other metrics of interest that provide more detailed information on the quality of the stream. They include one or more of the following:

Other Failure Metrics: Besides the overall failure rate, more specific failure rates that detail where and how the failure happened may be of interest. The specific metrics of interest are:

DNS Failure Rate: failed at the dns lookup to locate a server.

Connect Failure Rate: failed at the connect stage, example, the requested media was not present.

Buffer Failure Rate: failed to startup because initial buffering could not be completed, for example, data not flowing at a sufficient rate from server to client.

Stream Disconnect Rate: failed in the middle of playback, example, connectivity lost with the server before playback could complete.

Components of Startup Time: The three metrics below add up to the Startup Time metric.

DNS Lookup Time: The time it takes for the client to lookup the domain name in the URL and obtain an IP address of the media server serving the stream.

Connect Time: The time it takes for the client to complete the protocol handshake with the server and obtain a description of the media.

Initial Buffering Time: The time it takes for the client to receive sufficient data from the server to start the playback.

Packet Metrics: While the bandwidth metrics, such as playback bandwidth, focus on the rate at which bytes are delivered to the client, the packet metrics focus on the rate at which packets are delivered to the client. Bandwidth metrics are generally more robust, because they reflect the information content delivered to the client more accurately. Moreover, packets can be of varying size containing varying amounts of information, which makes packet count less robust. Packet counts can also vary from playback to playback for the same media for reasons other than quality, depending on how packetization is done at the server. Nevertheless, packet metrics typically are of some interest as a quality measure.

Useful Packet Rate: This is the rate at which useful packets are delivered to the client. It should be noted a packet typically is useful only if the packet arrived at the client in a timely fashion, without being thinned by the server, or lost in an unrecoverable fashion in transit to the client, or arriving too late to be used by the playback.

Normal Packet Rate: Of the packets that are received by the client core, some packets arrive without the client having to re-request them from the server. These packets constitute the normal packet rate.

Recovered Packet Rate: Of the packets that are delivered to the client, some packets are lost or arrive out-of-order and are recovered by the client. These packets constitute the recovered packet rate.

Unrecoverable Packet Rate: These packets were sent by the server but were lost and could never be recovered by the client.

A fundamental issue with the three preceding packet metrics is that they do not capture what was never sent by the server, or those packets that arrive too late to be useful. Also, these metrics are measured at the level of the client application. There may be bad stream quality yet there are no unrecoverable (i.e., lost) packets as perceived by the client. This is typically the case when streaming data over TCP, because TCP provides an abstraction (of no loss) to the streaming client that sits on top of it. The metrics are more meaningful when streaming over UDP, where the client actually sees the loss happening on the network. Nevertheless, the notion of playback bandwidth as described above is a much more robust and meaningful measure of thinning and information loss.

Other Bandwidth Metrics. Besides actual and ideal playback bandwidths, three other bandwidths may also be of interest, as described below.

Maximum and Minimum Encoded Bandwidth: For single-bitrate media, there is only one encoding, and the maximum and minimum encoded bandwidths both equal the encoded bitrate of the media. In the case of multi-bitrate media, there are multiple interleaved encodings, each encoding at a different bitrate. In this case, when the network degrades, the server may step down from a higher-bitrate encoding to a lower-bitrate encoding, effectively thinning the media. This stepdown is captured by recording both the maximum and minimum bandwidth of the encodings used in the playback.

Network Bandwidth. This is the bandwidth of the data received by the player from the server. Note that while network bandwidth provides some idea of stream performance, it is not an accurate measure. Network bandwidth counts duplicate and retransmitted packets multiply, though they do not contribute to greater streaming performance and, in fact, are signs of network degradation. A typical situation is when packets come out-of-order, the client asks for a retransmit, and receives two copies of the same packet, thereby increasing the network bandwidth with no increase in stream quality. Further, network bandwidth does not distinguish between bytes that are useful and bytes that are not. A typical situation is the server sending bytes to the client too late to be useful in the playback; these bytes are included in the network bandwidth, but they do not contribute to increased stream quality. Finally, the server bursts an initial portion of the data to the client before sending a steady stream at the appropriate bitrate for the stream. The initial burst increases the network bandwidth initially above the encoded rate, which can hide any deterioration in the bandwidth and drop in stream quality later in the test. These problems are avoided by measuring actual playback bandwidth, which indicates what bandwidth was used in the rendering. Still, network bandwidth provides general information and is worth retaining as an auxiliary metric.

How to Measure the First Level Metrics

Failure Rate: The PMM preferably uses callback functions to record the stage at which the failure happened, i.e., during a DNS lookup, during the connect phase, during the initial buffer phase, or during playback. Preferably, an error code corresponding to the different failure modes is produced. In addition, any error code produced by the media player itself is recorded. The error code combinations are then analyzed to produce the failure rate.

Details for Real: When an error occurs, two error codes are reported, "error" and "real_error". The "error" field specifies either the particular error type, in the event of a "synchronous" error in the agent code, such as a timeout or DNS lookup failure, or that an "asynchronous" error occurred in the RealSystem SDK code. For synchronous errors, the "real_error" field is ignored. Failures reported by the RealSystem SDK are captured by implementing the ErrorOccurred( ) method of the IRMAErrorSink interface; the error code passed to this method is stored in the "real_error" field. The "error" field describes the stage in which the failure happened. Once the Real connection has been opened, the stage is determined by registering an IRMAClientAdviceSink interface and implementing the OnBuffering( ), OnPosLength( ), and OnStop( ) callbacks. Specifically, the contacting phase begins as soon as the connection is opened; the buffering phase begins when the OnBuffering( ) callback is invoked; and the playing phase begins when the OnPosLength( ) callback is invoked with a positive ulposition argument.

Details for Windows Media: When an error occurs, two error codes are reported by the agent, "error" and "wms_error". The "error" field specifies either the particular error type, in the event of a synchronous error in the agent code such as a timeout or DNS lookup failure, or that an "asynchronous" error occurred in the Windows Media SDK code. For errors in the agent code, the "wms_error" field is ignored. Failures reported by the Windows Media SDK are captured by handling the WMT_ERROR status value in the OnStatus( ) method of the IWMStatusCallback interface; the error code passed to this method is stored in the "wms_error" field. The "error" field also describes the stage in which the failure happened. Once the WMS connection has been opened, the stage is determined by registering an IWMStatusCallback interface and implementing the OnStatus( ) callback. Specifically, the contacting phase begins on a WMT_CONNECTING event; the buffering phase begins on a WMT_BUFFERING_START event; and the playing phase begins on a WMT_STARTED event.

Startup Time. The performance monitor starts a clock at the beginning of the test and queries the state of the media player, preferably using player callback functions. When the media player transitions into the play-state, the time is noted as the startup time.

Details for Real. The time spent in each of the contacting and buffering phases is measured using the IRMAClientAdviceSink callbacks as described above. The connect time is the time between calls to OnContacting( ) and OnBuffering( ), and the initial buffering time is the time between calls to OnBuffering( ) and OnPosLength( ). The startup time is the time from the beginning of the test (including DNS lookup time) to the first call of OnPosLength( )

Details for WMS. The time spent in each of the contacting and buffering phases is measured using the IWMStatusCallback interface as described above. The connection time is the time between the WMT_CONNECTING and WMT_BUFFERING_START events, and the initial buffering time is the time between the WMT_BUFFERING_START and WMT_STARTED events. The startup time is the time from the beginning of the test (including DNS lookup time) to the first call of WMT_STARTED.

Thinning and Loss: As noted above, the PMM preferably computes actual playback bandwidth by intercepting and examining the useful packets that are sent from the core to the renderer. A total useful bytes delivered B is computed by adding the bytes of the useful packets. A stream time T is computed using a callback function to determine the amount of the clip that was successfully played back at the end of the test. Actual playback bandwidth is computed as B/T. Ideal playback bandwidth is the actual playback bandwidth when the media is streamed under ideal conditions without degradation. This quantity can be computed in one of two ways. For live streams, ideal playback bandwidth can be computed as a function of the encoded bandwidth of the media with some adjustments to the fact that the ideal playback bandwidth of an ongoing live stream will show some variations over time. For on-demand streams, ideal playback bandwidth can be computed with 100% accuracy by calibrating the media, i.e., by measuring the actual playback bandwidth when the media is streamed under ideal network conditions without degradation. In practice, this calibration step is not fully necessary; using the largest observed value of actual playback bandwidth over several dozen tests works well. Comparing the actual playback bandwidth with the ideal playback bandwidth provides a good notion of how much thinning and loss occurred.

Details for Real. The manner in which PMM intercepts useful packets flowing from the core to the renderer is as follows. For each renderer plugin included with the RealPlayer application, a wrapper-renderer that contains the name of the original plugin is provided. When the wrapper-renderer is loaded, it opens the original plugin as a dynamic library and forwards incoming method calls to the original renderer. Several methods have additional code for computing the metrics. The methods relevant to playback bandwidth measurement are OnPacket( ), which is called when the RealPlayer core sends a packet of data to the renderer, and OnTimeSync( ), which asks the renderer to update its current time. The way packets ate counted differs slightly for live and on-demand streams, but the basic approach is preferably the same, i.e., count packets used by the renderer for a given segment of playback. For on-demand streams, the playback segment is known in advance (time 0 to time MAX_STREAM_TIME), so packets with timestamp less than MAX_STREAM_TIME are counted as useful. For live streams, the beginning of the playback segment is not time 0, so this approach will not work. Instead, packets are queued as they are received, and when the OnTimeSync( ) method is called with a time t, all packets with time less than t are counted as useful and removed from the queue. (The type of the stream is determined by the IsLive( ) method, a method of the IRMAStreamSource of the IRMAStream passed to StartStream( )).

Details for WMS. The PMM does not require wrapper-renderers to obtain the useful packets for WMS. The compressed data packets are obtained by implementing the OnStreamSample( ) method of the IWMReaderCallbackAdvanced interface. A packet is included if its timestamp is less than MAX_STREAM_TIME.

Interruptions. The number of rebuffer events and the duration of each rebuffer event during the playback is recorded by the PMM by querying the state of the media player using callback functions. Further, the play time of the clip, which is the total time the playback took, is recorded. The play time is different from stream time when there are rebuffers. The rebuffers-per-minute metric is simply the number of rebuffer events divided by the play time in minutes. The rebuffer-time-per-minute is simply the total duration of all the rebuffer events divided by the play time.

Details for Real. Rebuffering time is measured between calls to the OnBuffering( ) and OnPosLength( ) callbacks of the IRMAClientAdviceSink interface. The stream time is measured by the last time passed to the OnPosLength( ) callback, and the play time is measured as actual clock time since the first OnPosLength( ) call.

Details for WMS. Rebuffering time is measured between the WMT_BUFFERING_START and WMT_BUFFERING_STOP events in the IWMStatusCallback::OnStatus( ) method. The stream time is obtained from the IWMReaderStreamClock::GetTime( ) method, and the play time is measured as actual clock time since the first WMT_STARTED event.

How to measure the Auxiliary Metrics

Other Failure Rates: The DNS failure rate, connect failure rate, buffer failure rate, and the stream disconnect rate can all be computed error codes output by the agent which determine both the cause of failure and the state of the playback when the failure occurred.

Components of Startup time: To measure DNS lookup time, the agent performs the DNS lookup of the server name itself using gethostbyname( ), and then it passes the resulting IP address into the player core as part of the URL. This also allows the agent to report the exact IP address of the server from which the test stream is played. The other components of the startup time are measured using callback functions as outlined above.

Packet Metrics. For the most part, these metrics are obtained using a callback to the player statistics. The useful packets metric is an exception, which is computed directly by the PMM intercepting useful packets.

Other Bandwidth Metrics. These metrics are also computed using callbacks to the player statistics.

As noted above, the streaming agent may be implemented as a standalone device, or a set of such agents may be implemented, preferably in a distributed manner, to enable a content or other service provider to determine stream quality and performance from a plurality of different locations. In such case, an agent is implemented at each such location, and the distribed agents are controlled to each request a given stream. As the streams are being delivered from one or more media servers to media players that include the embedded agent software, data is collected. Periodically, that data is transferred from the agents to a central management location, where it is processed into reports or otherwise made available for viewing (e.g., via a secure portal), for downloading, or for other analysis. In one particular embodiment, the agents comprise part of a content delivery network (CDN) and are used to enable a CDN service provider (or CDN customers) to determine stream quality and performance. As is well-known, a CDN is a collection of content servers and associated control mechanisms that offload work from Web site origin servers by delivering content on their behalf to end users. A well-managed CDN achieves this goal by serving streaming media, or some or all of the contents of a site's Web pages, thereby reducing the customer's costs while enhancing an end user's browsing experience from the site. In operation, the CDN typically uses a request routing mechanism to locate a CDN content server close to the client to serve each request directed to the CDN, where the notion of "close" is based, in part, on evaluating results of network traffic tests. A CDN may be used to provide live or on-demand streaming.

The invention claimed is:

1. Apparatus, comprising:
   a core;
   a renderer;
   a first set of code located intermediate the core and the renderer for generating a first metric as a stream of useful data packets are passed between the core and the renderer, wherein the first metric is a statistic computed from the intercepted useful data packets; and
   wherein each useful data packet has a given set of properties, wherein the properties are that the packet has not been thinned by a server, that the packet was not lost in an unrecoverable manner during transport, and that the packet arrived at the renderer in time to be useful for rendering.

2. The apparatus as described in claim 1 wherein the first metric is useful packet rate.

3. The apparatus as described in claim 1 wherein the first metric is actual playback bandwidth.

4. The apparatus as described in claim 1 wherein the first set of code generates a second metric using a player callback function.

5. The apparatus as described in claim 4 wherein the second metric is selected from a set of metrics that include: startup time, startup time components, and interruption and rebuffer statistics.

6. The apparatus as described in claim 1 further including a second set of code for receiving a test suite identifying at least one stream quality test, for scheduling the test suite, and for outputting the first metric captured by the first set of code.

7. The apparatus as described in claim 6 wherein the test suite includes a set of parameters selected from a set that includes: a start time, and at least one test.

8. The apparatus as described in claim 7 wherein the test includes a set of parameters selected from a set that includes: a URL, a maximum startup time, a maximum stream time, and a maximum play time.

9. The apparatus as described in claim 6 wherein the second set of code logs the first metric into a log file.

* * * * *